(12) United States Patent
Brown

(10) Patent No.: US 7,953,598 B2
(45) Date of Patent: May 31, 2011

(54) GRAMMAR WEIGHTING VOICE RECOGNITION INFORMATION

(75) Inventor: Kevin W. Brown, Peyton, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 752 days.

(21) Appl. No.: 11/957,692

(22) Filed: Dec. 17, 2007

(65) Prior Publication Data

US 2009/0157404 A1    Jun. 18, 2009

(51) Int. Cl.
*G10L 15/00* (2006.01)

(52) U.S. Cl. ............... 704/240; 704/255; 704/10; 704/4

(58) Field of Classification Search .................. 704/231, 704/255, 235, 270, 275, 270.1, 1, 3, 4, 7, 704/9, 10, 240, 254, 257

See application file for complete search history.

(56) References Cited

U.S. PATENT DOCUMENTS

| 6,985,862 B2 * | 1/2006 | Strom et al. | 704/255 |
| 7,103,542 B2 * | 9/2006 | Doyle | 704/231 |

* cited by examiner

*Primary Examiner* — Huyen X. Vo

(57) ABSTRACT

A device receives a voice recognition statistic from a voice recognition application and applies a grammar improvement rule based on the voice recognition statistic. The device also automatically adjusts a weight of the voice recognition statistic based on the grammar improvement rule, and outputs the weight adjusted voice recognition statistic for use in the voice recognition application.

19 Claims, 8 Drawing Sheets

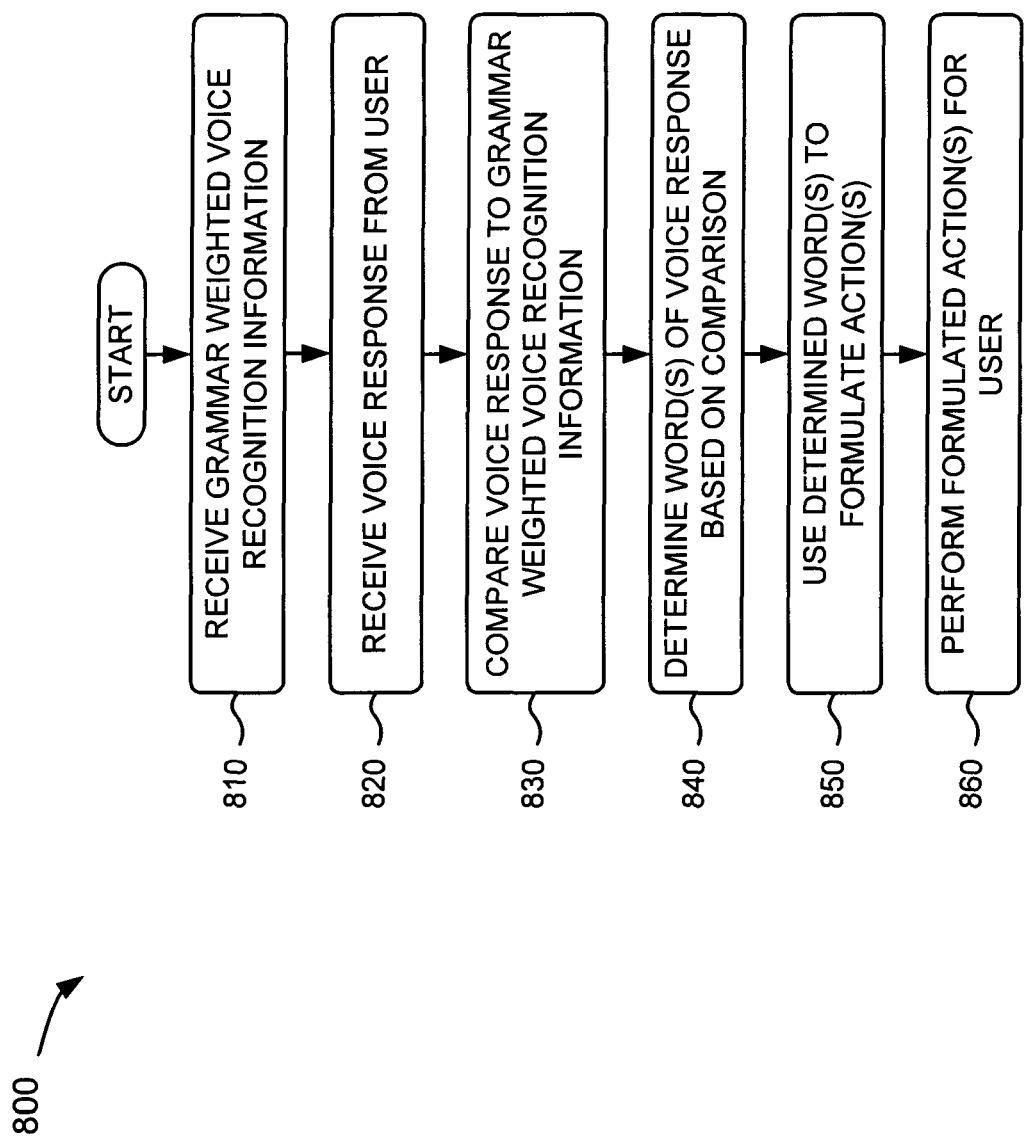

GRAMMAR WEIGHTING VOICE RECOGNITION INFORMATION

BACKGROUND

Voice or speech recognition systems (e.g., an interactive voice response (IVR) system) may be used for a variety applications, such as voice dialing (e.g., "call home"), call routing (e.g., "I would like to make a collect call"), data entry (e.g., entering a credit card number), preparation of structured documents (e.g., a report), content-based spoken audio search (e.g., find a song when particular words were spoken), etc. IVR generally refers to a computerized system that allows a user, typically a telephone caller, to select an option from a voice menu or otherwise interface with a computer system. Generally, the system plays pre-recorded voice prompts to which the user responds by either pressing a number on a telephone keypad or speaking to the system.

The success of a voice recognition application may depend on how rigorously a speech application has been tested. However, user inputs (e.g., spoken words or voice recognition entries) to the voice recognition application may change from time to time. This may cause the voice recognition application to be less efficient and less accurate as time passes.

BRIEF DESCRIPTION OF THE DRAWINGS

FIGS. 6-8 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that acquire and use statistical information associated with voice recognition events to automatically adjust grammar usages and/or weightings of individual grammar entries to improve overall voice recognition performance. For example, in one implementation, the systems and/or methods may receive voice recognition statistics (e.g., from a voice recognition application), and may apply grammar improvement rules to the voice recognition statistics. The systems and/or methods may automatically adjust weights of the voice recognition statistics based on the grammar improvement rules, may store the weight adjusted voice recognition statistics, and/or may output the weight adjusted voice recognition statistics for use in the voice recognition application.

"Grammar," as the term is used herein, is to be broadly construed to include any oral, verbal, audible, etc. response (e.g., one or more words) capable of being provided by a user to a voice recognition application and/or recognized by the voice recognition application. Grammar may also be construed to include one or more rules used by the voice recognition application.

Figure 1:
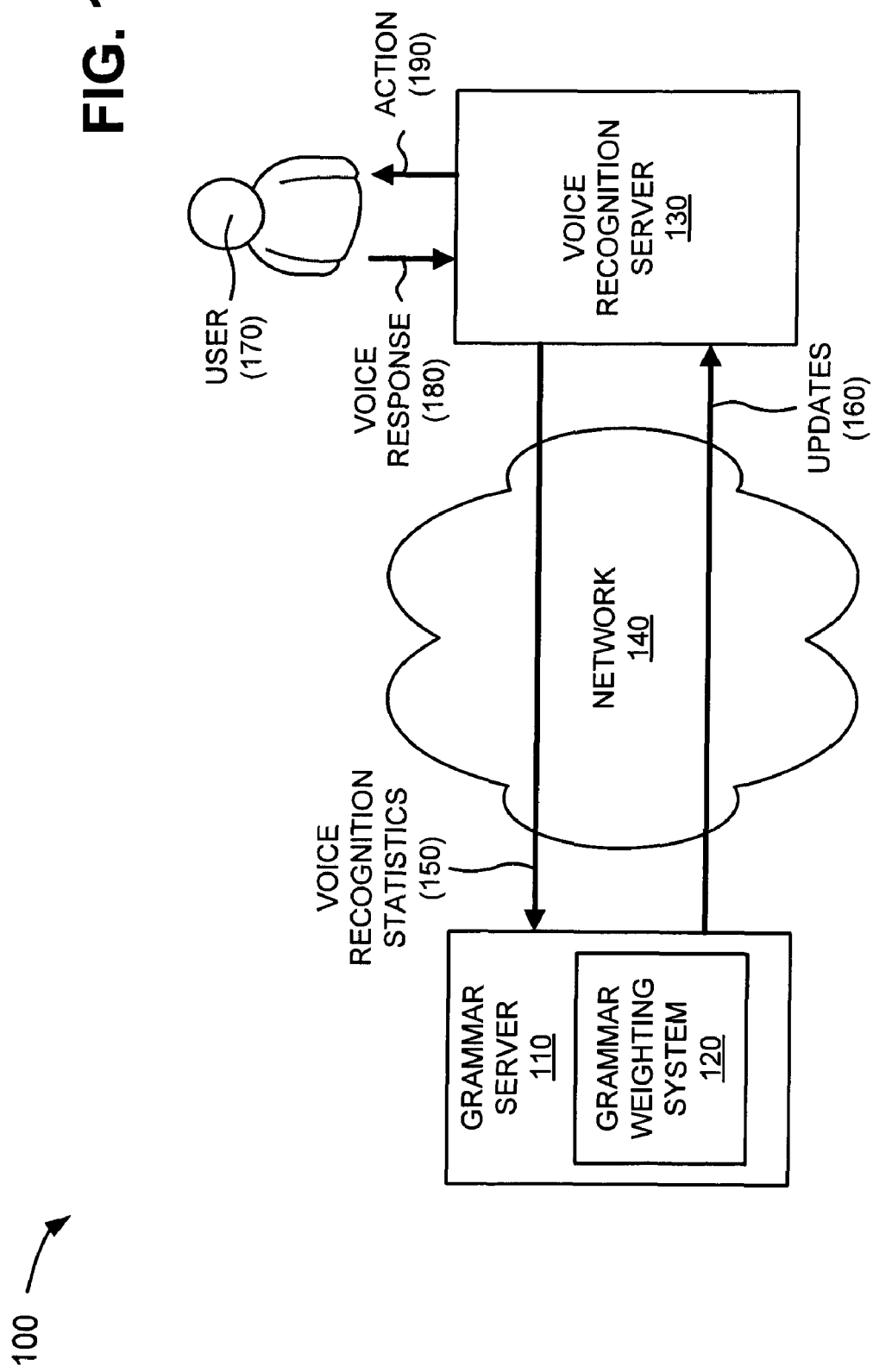
FIG. 1 is an exemplary diagram of a network in which systems and methods described herein may be implemented.

FIG. 1 is an exemplary diagram of a network 100 in which systems and methods described herein may be implemented. As illustrated, network 100 may include a grammar server 110 (e.g., that includes a grammar weighting system 120), a voice recognition server 130, and a network 140. Grammar server 110 and/or voice recognition server 130 may connect to network 140 via wired and/or wireless connections. A single grammar server, voice recognition server, and network have been illustrated in FIG. 1 for simplicity. In practice, there may be more or less grammar servers, voice recognition servers, and/or networks. Also, in some instances, one or more of grammar server 110 and/or voice recognition server 130 may perform one or more functions described as being performed by another one or more of grammar server 110 and/or voice recognition server 130. Further, in some instances, grammar server 110 and voice recognition server 130 may be combined into a single device and/or platform.

Grammar server 110 may include one or more server entities, or other types of computation or communication devices, that gather, process, search, and/or provide information in a manner described herein. In one implementation, grammar server 110 may include grammar weighting system 120 that may acquire (e.g., from voice recognition server 130) statistical information associated with voice recognition events, such as current grammar trends, grammar usage patterns, seasonal grammar information, etc., associated with user inputs (e.g., voice recognition events). Grammar weighting system 120 may use the statistical information to automatically adjust grammar usages and/or weightings of individual grammar entries to improve overall voice recognition performance (e.g., of voice recognition server 130). In other implementations, grammar weighting system 120 may be incorporated within voice recognition server 130, and grammar server 110 may be omitted. Further details of grammar server 110 and/or grammar weighting system 120 are provided below in connection with FIGS. 4 and 5.

Voice recognition server 130 may include one or more server entities, or other types of computation or communication devices, that gather, process, search, and/or provide information in a manner described herein. In one implementation, voice recognition server 130 may include a voice or speech recognition application, such as an interactive voice response (IVR) application, a voice dialing application, a call routing application, a data entry application, a structured documents preparation application, a content-based spoken audio search application, etc.

Network 140 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

As further shown in FIG. 1, voice recognition server 130 may generate voice recognition statistics 150 associated with voice recognition events (e.g., user responses to questions that may be provided by voice recognition server 130, etc.). In one implementation, voice recognition statistics 150 may include current grammar trend information, grammar usage pattern information, seasonal grammar information, etc., associated with user inputs (e.g., voice recognition events).

Current trend grammar information may include information associated with current user responses or grammars that may be provided to voice recognition server 130 (e.g., what users may be saying to the voice recognition application associated with voice recognition server 130). Grammar usage pattern information may include information associated with a number of times a particular voice recognition event or response may be provided to voice recognition server 130 (e.g., a name "John" may be provided twenty times, whereas a name "Pete" may be provided one time). Seasonal grammar information may include information associated with a period of time (e.g., a season, such as fall, winter, spring, and/or summer; a month; a holiday; etc.) that may affect voice recognition events or responses provided to voice recognition server 130. Alternatively and/or additionally, voice recognition statistics 150 may include metadata associated with voice recognition events recognized by voice recognition server 130, and may include confidence information that voice recognition events were correctly recognized. Voice recognition server 130 may provide voice recognition statistics 150 to grammar server 110 (e.g., to grammar weighting system 120).

Grammar server 110 (e.g., grammar weighting system 120) may receive voice recognition statistics 150, and may apply grammar improvement rules based on voice recognition statistics 150 to automatically adjust grammar usages and/or weightings of individual grammar entries (e.g., of voice recognition statistics 150) to improve overall voice recognition performance (e.g., of voice recognition server 130). Grammar weighting system 120 may output adjusted grammar usages and/or weightings of grammar entries as grammar weighted voice recognition information (e.g., referred to as updates 160 in FIG. 1), and may provide updates 160 to voice recognition server 130. In one implementation, updates 160 may include grammar entries with weights adjusted based on current trend information, grammar usage pattern information, seasonal grammar information, etc., provided to voice recognition server 130. Additionally and/or alternatively, updates 160 may eliminate (or retire) grammar entries that may not be used (e.g., which may decrease the number of grammar entries), and may segregate popular or frequently used grammar entries from other grammar entries (e.g., this may enable voice recognition server 130 to first review popular grammar entries when determining what a user is requesting or saying, which may save time). With regard to grammar usage patterns, updates 160 may provide greater weights to popular or frequently used grammar entries than weights provided to less frequently used grammar entries. With regard to seasonal grammar information, updates 160 may provide greater weights to current seasonal grammar entries (e.g., entries related to summer when it is currently summertime) than weights provided to out-of-season grammar entries.

Voice recognition server 130 may receive updates 160, and may use updates 160 to aid in deciphering voice recognition events received by voice recognition server 130. As further shown in FIG. 1, a user 170 (e.g., via a user device, such as a telephone, a cellular radiotelephone, a personal digital assistant (PDA), etc.) may provide a voice response 180 (e.g., a voice recognition event) to voice recognition server 130. User 170 may include any person capable of using the voice recognition application provided by voice recognition server 130. Voice recognition server 130 may compare voice response 180 to updates 160 (and/or to any other information used by the voice recognition application to recognize speech), and may determine one or more words of voice response 180 based on the comparison. Voice recognition server 130 may use the determined one or more words to formulate an action 190 that may respond to voice response 180, and/or may perform action 190. For example, if voice response 180 requests a time a particular movie is playing (e.g., "When is the next time Batman is playing?"), action 190 may provide the requested time (e.g., "The next showing of Batman is at 8:00 PM").

Grammar server 110 (e.g., grammar weighting system 120) may enable voice recognition server 130 to become more efficient and accurate as time passes, and to self-adjust to changing user patterns (e.g., by applying recent recognition events to current voice recognition sessions). Grammar weighting system 120 may provide updates 160 to voice recognition server 130 in real time (e.g., without requiring voice recognition server 130 to restart), may store updates 160 (e.g., within grammar server 110) for tracking purposes, and/or may permit execution-time configuration of parameters that determine updates 160.

Figure 2:
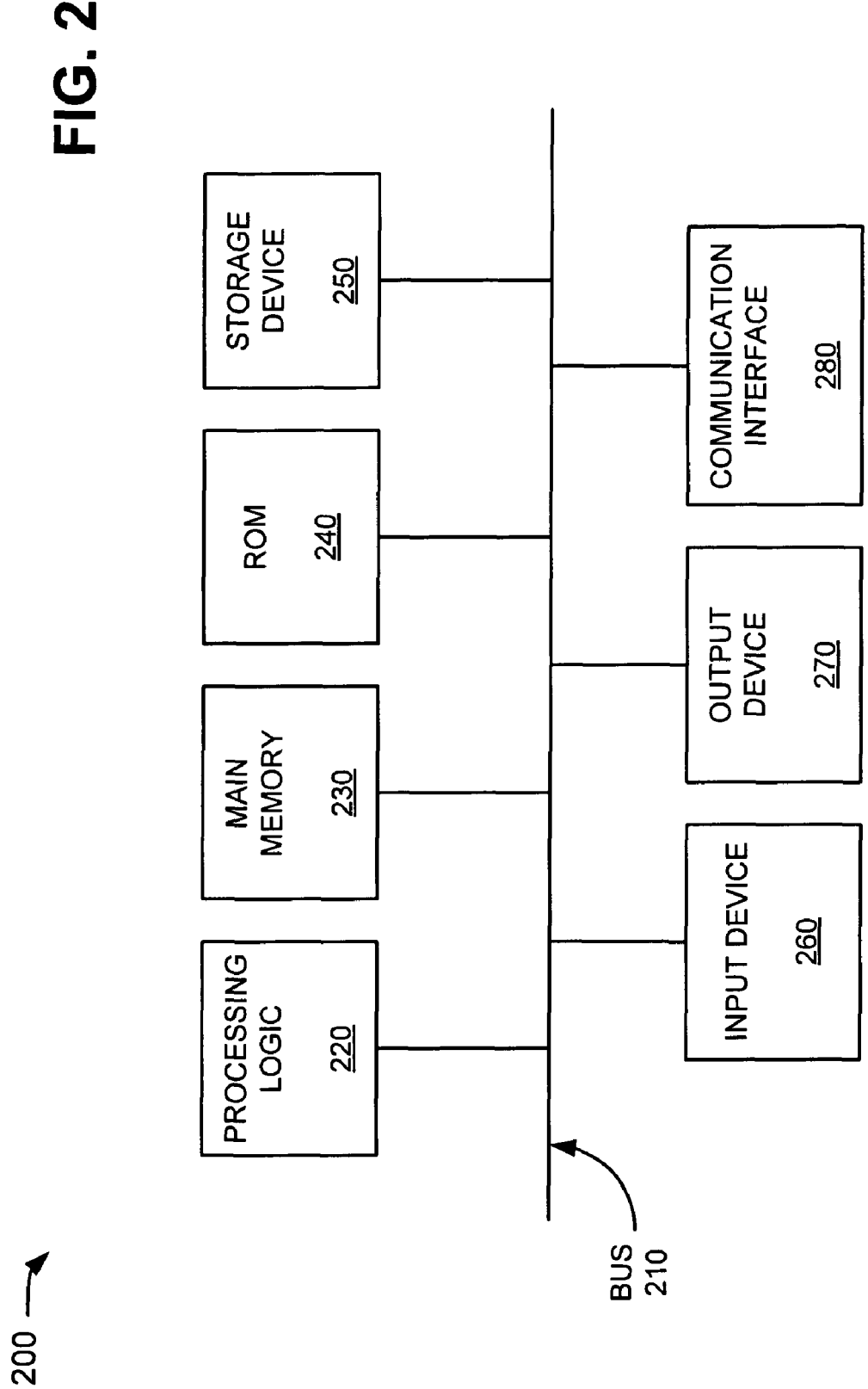
FIG. 2 illustrates exemplary components of a grammar server and/or a voice recognition server of the network depicted in FIG. 1.

FIG. 2 is an exemplary diagram of a device 200 that may correspond to grammar server 110 and/or voice recognition server 130. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
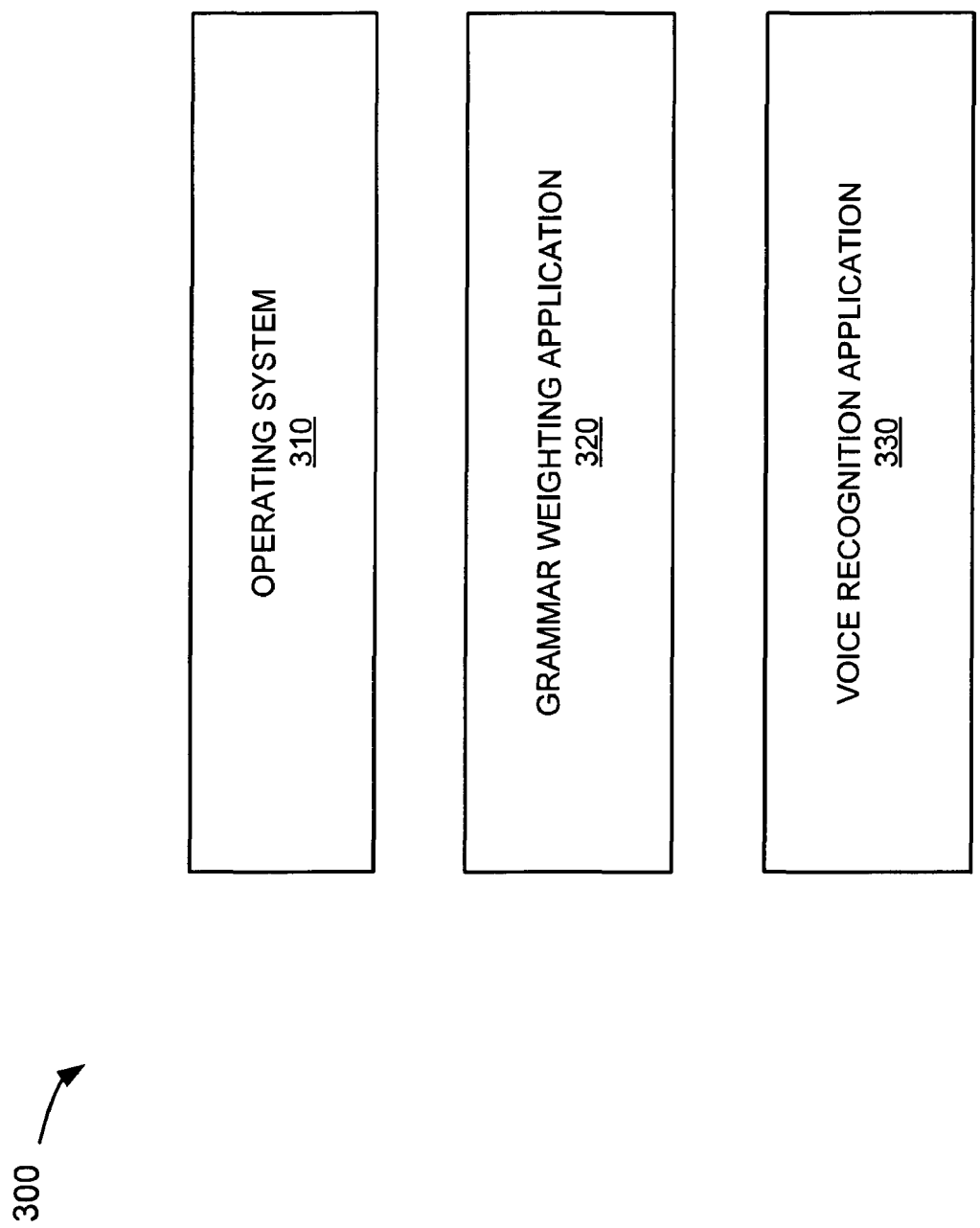
FIG. 3 depicts a diagram of a portion of an exemplary computer-readable medium that may be used by the device of FIG. 2.

FIG. 3 is a diagram of a portion of an exemplary computer-readable medium 300 that may be used by a device, such as device 200. In one implementation, computer-readable medium 300 may correspond to main memory 230 of device 200. The portion of computer-readable medium 300 illustrated in FIG. 3 may include an operating system 310, a grammar weighting application 320, and a voice recognition application 330. Grammar weighting application 320 and/or voice recognition application 330 may be included in operating system 310 or may be separate from operating system 310. Grammar weighting application 320 may be included in voice recognition application 330 or may be separate from voice recognition application 330. In one implementation, voice recognition application 330 may be a process separate from operating system 310 and/or grammar weighting application 320. In this latter implementation, voice recognition application 330 may be provided on a device (e.g., voice recognition server 130) separate from a device (e.g., grammar server 110) that includes grammar weighting application 320, but may interact with grammar weighting application 320, e.g., via network 140.

Operating system 310 may include operating system software, such as the Microsoft Windows, Apple MAC OS, Linux, Unix, IBM OS/2, and/or other types of operating systems capable of use in server entities or other types of computation or communication devices.

Grammar weighting application 320 may include an executable object or process. Device 200 may obtain the executable object or process from a server or from a disk, tape, network, CD-ROM, etc. Alternatively, the executable object or process may be pre-installed on device 200. Grammar weighting application 320 may perform any of the functions described herein as being performed by grammar server 110 and/or grammar weighting system 120. Grammar weighting application 320 may be automatically activated upon initiation of operating system 310 and/or voice recognition application 330. Alternatively, grammar weighting application 320 may be activated when instructed by a user. In either case, grammar weighting application 320 may acquire and use statistical information associated with voice recognition events to automatically adjust grammar usages and/or weightings of individual grammar entries to improve overall voice recognition performance, as described herein.

Voice recognition application 330 may include an executable object or process. Device 200 may obtain the executable object or process from a server or from a disk, tape, network, CD-ROM, etc. Alternatively, the executable object or process may be pre-installed on device 200. Voice recognition application 330 may perform any of the functions described herein as being performed by voice recognition server 130 and/or the voice recognition application provided in voice recognition server 130. Voice recognition application 330 may be automatically activated upon initiation of operating system 310. Alternatively, voice recognition application 330 may be activated when instructed by a user. In either case, voice recognition application 330 may perform voice or speech recognition functions, such as IVR functions, voice dialing functions, call routing functions, data entry functions, structured documents preparation functions, content-based spoken audio search functions, etc., as described herein.

Voice recognition application 330 may operate in conjunction with grammar weighting application 320, and may enable grammar weighting application 320 to acquire, from voice recognition application 330, statistical information associated with voice recognition events. Grammar weighting application 320 may use the statistical information to automatically adjust grammar usages and/or weightings of individual grammar entries to improve overall voice recognition performance of voice recognition application 330.

Figure 4:
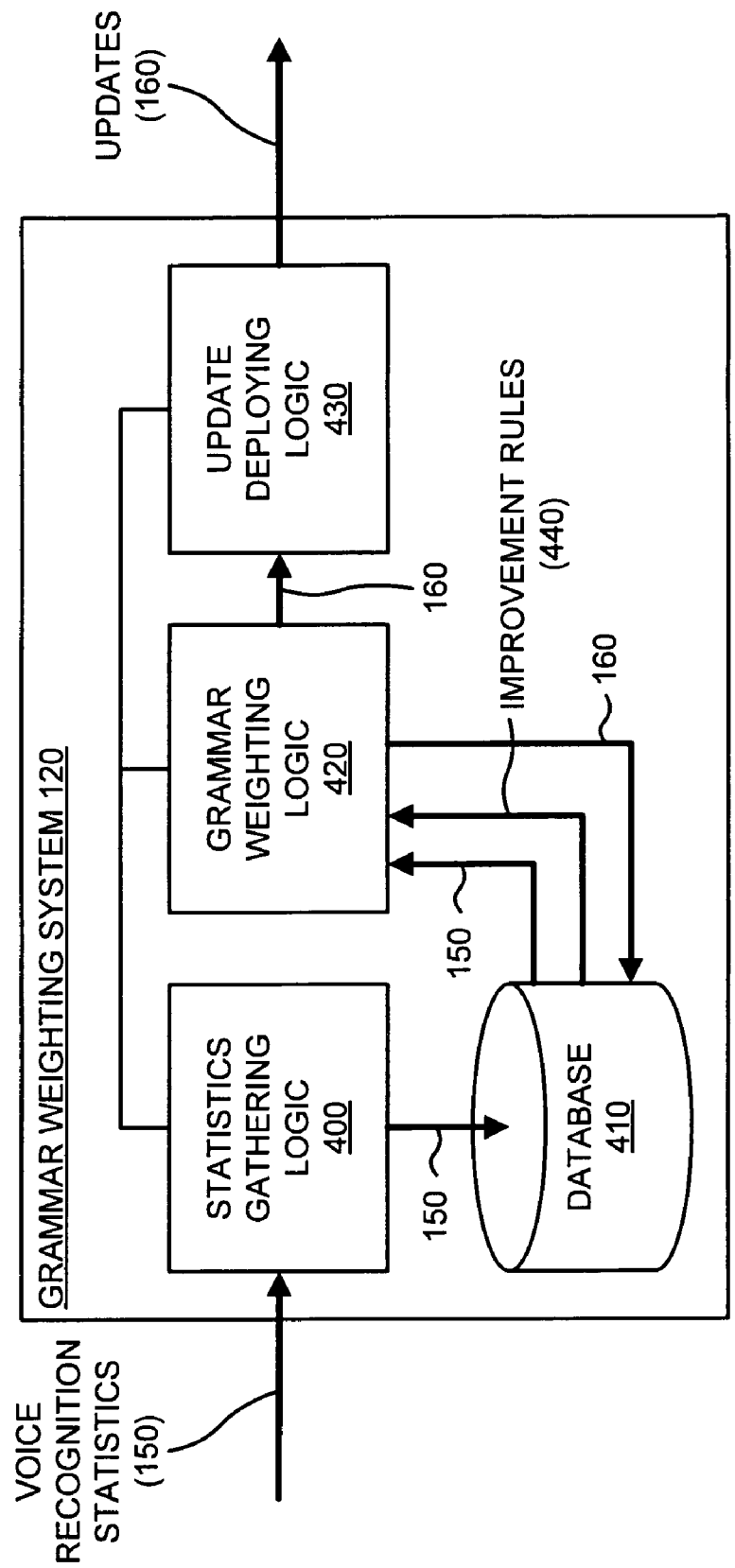
FIG. 4 illustrates an exemplary functional block diagram of a grammar weighting system provided in the grammar server of the network depicted in FIG. 1.

FIG. 4 illustrates an exemplary functional block diagram of a grammar weighting system 120 provided in grammar server 110. As illustrated, grammar weighting system 120 may include statistics gathering logic 400, a database 410, grammar weighting logic 420, and update deploying logic 430. The functions described in FIG. 4 may be performed by one or more of the exemplary components of device 200 depicted in FIG. 2.

Statistics gathering logic 400 may include any hardware and/or software based logic (e.g., processing logic 220) that enables grammar weighting system 120 to acquire statistical information associated with voice recognition events (e.g., from voice recognition server 130). In one example, statistics gathering logic 400 may receive voice recognition statistics 150 from voice recognition server 130, and may provide voice recognition statistics 150 to database 410 for storage.

Database 410 may include one or more databases provided in a storage medium (e.g., main memory 230, ROM 240, storage device 250, etc.). In one implementation, database 410 may be provided in a storage medium of grammar server 110. In other implementations, database 410 may be provided in a storage medium of another device (e.g., voice recognition server 130) and may be accessible by grammar server 110 via a network (e.g., network 140). Database 410 may store voice recognition statistics 150 (e.g., received from statistics gathering logic 400), improvement rules 440, and/or other information that may be used to, for example, measure a trend in voice recognition events. Improvement rules 440 may include one or more rules that define how weights of grammar entries may change in response to trends in voice recognition statistics 150. For example, improvement rules 440 may include a rule that may eliminate grammar entries that may not be used, a rule that may segregate frequently used grammar entries from other grammar entries, a rule that may provide greater weights to frequently used grammar entries than weights provided to less frequently used grammar entries, a rule that may provide greater weights to current seasonal grammar entries than weights provided to out-of-season grammar entries, etc. Database 410 may provide voice recognition statistics 150 and/or improvement rules 440 to grammar weighting logic 420.

Grammar weighting logic 420 may include any hardware and/or software based logic (e.g., processing logic 220) that receives voice recognition statistics 150 and/or improvement rules 440 (e.g., from database 410), and generates updates 160 based on voice recognition statistics 150 and/or improvement rules 440. In one implementation, grammar weighting logic 420 may provide updates 160 to database 410 and/or to update deploying logic 430. Storing updates 160 in database 410 may enable grammar weighting system 120 to track output (e.g., updates 160) of grammar weighting logic 420 over time.

Update deploying logic 430 may include any hardware and/or software based logic (e.g., processing logic 220) that receives updates from grammar weighting logic 420, and determines whether grammar weightings of voice recognition server 130 need to be updated. If update deploying logic 430 determines that the grammar weightings of voice recognition server 130 need to be updated, update deploying logic 430 may provide updates 160 to voice recognition server 130 for updating the grammar weightings.

Although FIG. 4 shows exemplary functional components of grammar weighting system 120, in other implementations, grammar weighting system 120 may contain fewer, different, or additional functional components than depicted in FIG. 4. In still other implementations, one or more functional components of grammar weighting system 120 may perform one or more other tasks described as being performed by one or more other functional components of grammar weighting system 120.

Figure 5:
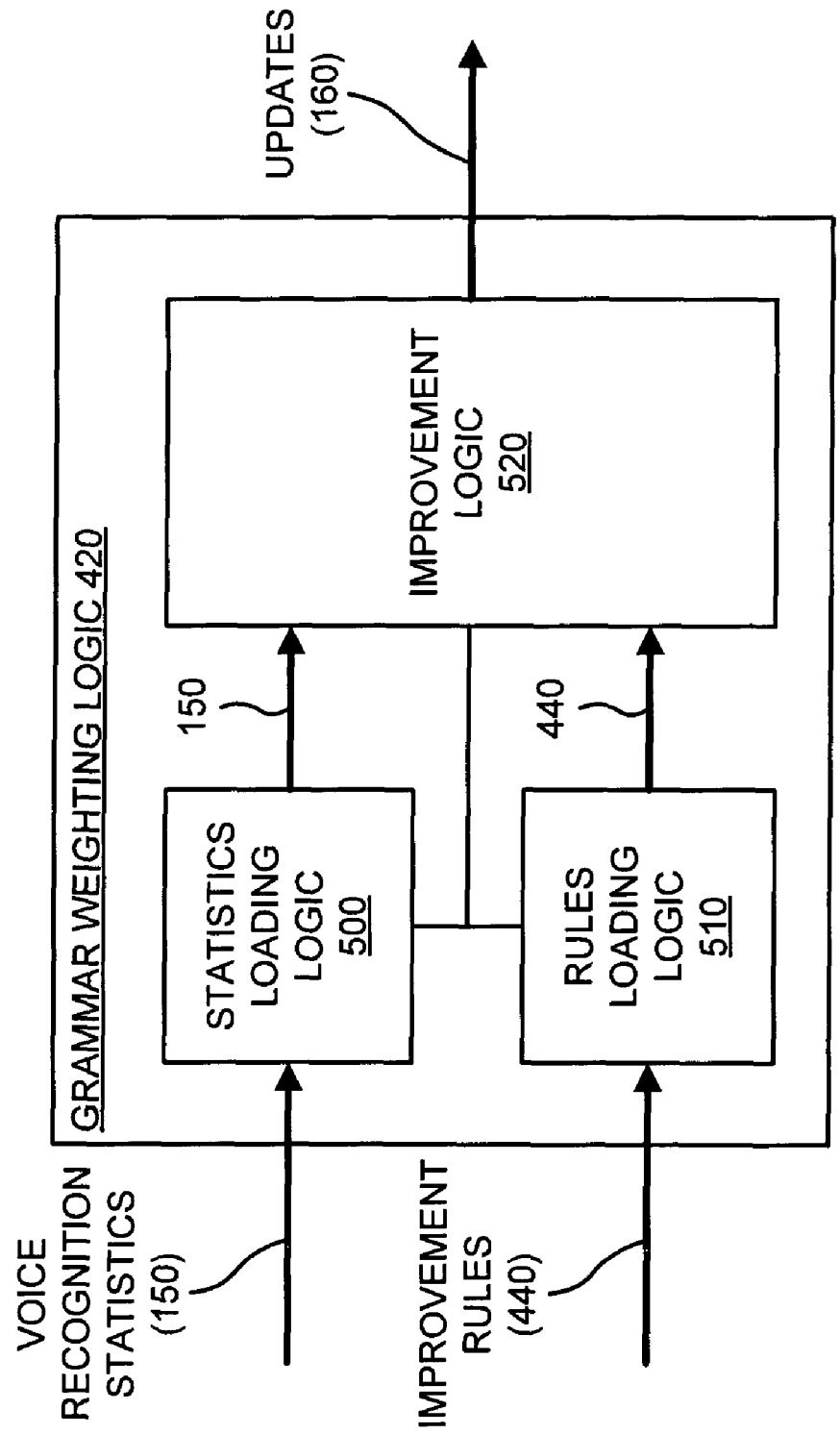
FIG. 5 depicts an exemplary functional block diagram of grammar weighting logic of the grammar weighting system depicted in FIG. 4.

FIG. 5 illustrates an exemplary functional block diagram of grammar weighting logic 420. As illustrated, grammar weighting logic 420 may include statistics loading logic 500, rules loading logic 510, and improvement logic 520. The functions described in FIG. 5 may be performed by one or more of the exemplary components of device 200 depicted in FIG. 2.

Statistics loading logic 500 may include any hardware and/or software based logic (e.g., processing logic 220) that receives voice recognition statistics 150 from database 410, and provides voice recognition statistics 150 to improvement logic 520.

Rules loading logic 510 may include any hardware and/or software based logic (e.g., processing logic 220) that receives improvement rules 440 from database 410, and provides improvement rules 440 to improvement logic 520.

Improvement logic 520 may include any hardware and/or software based logic (e.g., processing logic 220) that receives voice recognition statistics 150 from statistics loading logic 500 and improvement rules 440 from rules loading logic 510, and generates updates 160 based on voice recognition statistics 150 and improvement rules 440. In one implementation, improvement logic 520 may apply a rule (e.g., from improvement rules 440) that may eliminate unused grammar entries from voice recognition statistics 150, a rule (e.g., from improvement rules 440) that may segregate more frequently used grammar entries from other grammar entries of voice recognition statistics 150, a rule (e.g., from improvement rules 440) that may provide greater weights to more frequently used grammar entries than weights provided to less frequently used grammar entries of voice recognition statistics 150, a rule (e.g., from improvement rules 440) that may provide greater weights to current seasonal grammar entries than weights provided to out-of-season grammar entries of voice recognition statistics 150, etc. Improvement logic 520 may output the results of such rules as updates 160, and may provide updates 160 to update deploying logic 430.

Although FIG. 5 shows exemplary functional components of grammar weighting logic 420, in other implementations, grammar weighting logic 420 may contain fewer, different, or additional functional components than depicted in FIG. 5. In still other implementations, one or more functional components of grammar weighting logic 420 may perform one or more other tasks described as being performed by one or more other functional components of grammar weighting logic 420.

Figure 6:
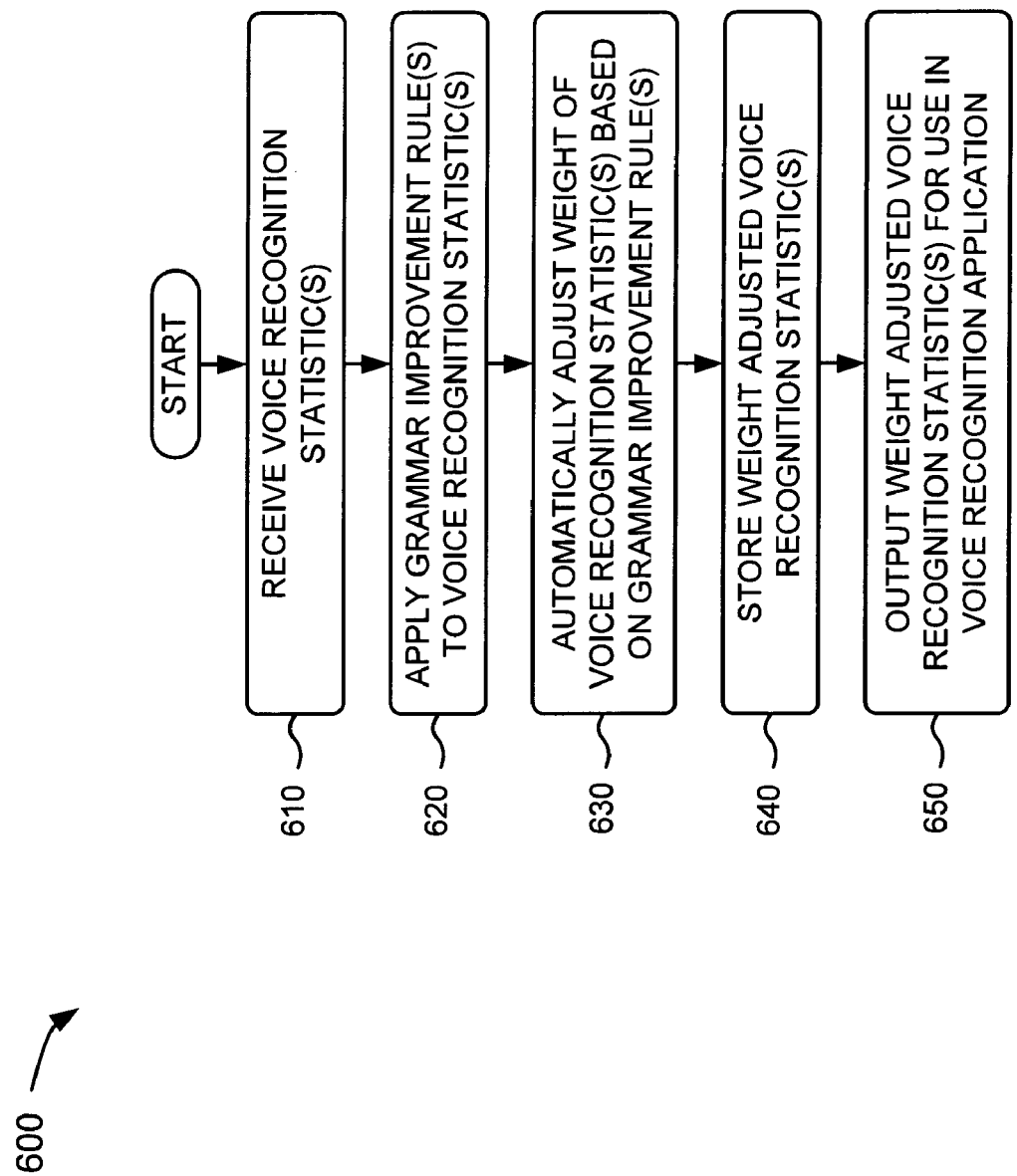
Figure 7:
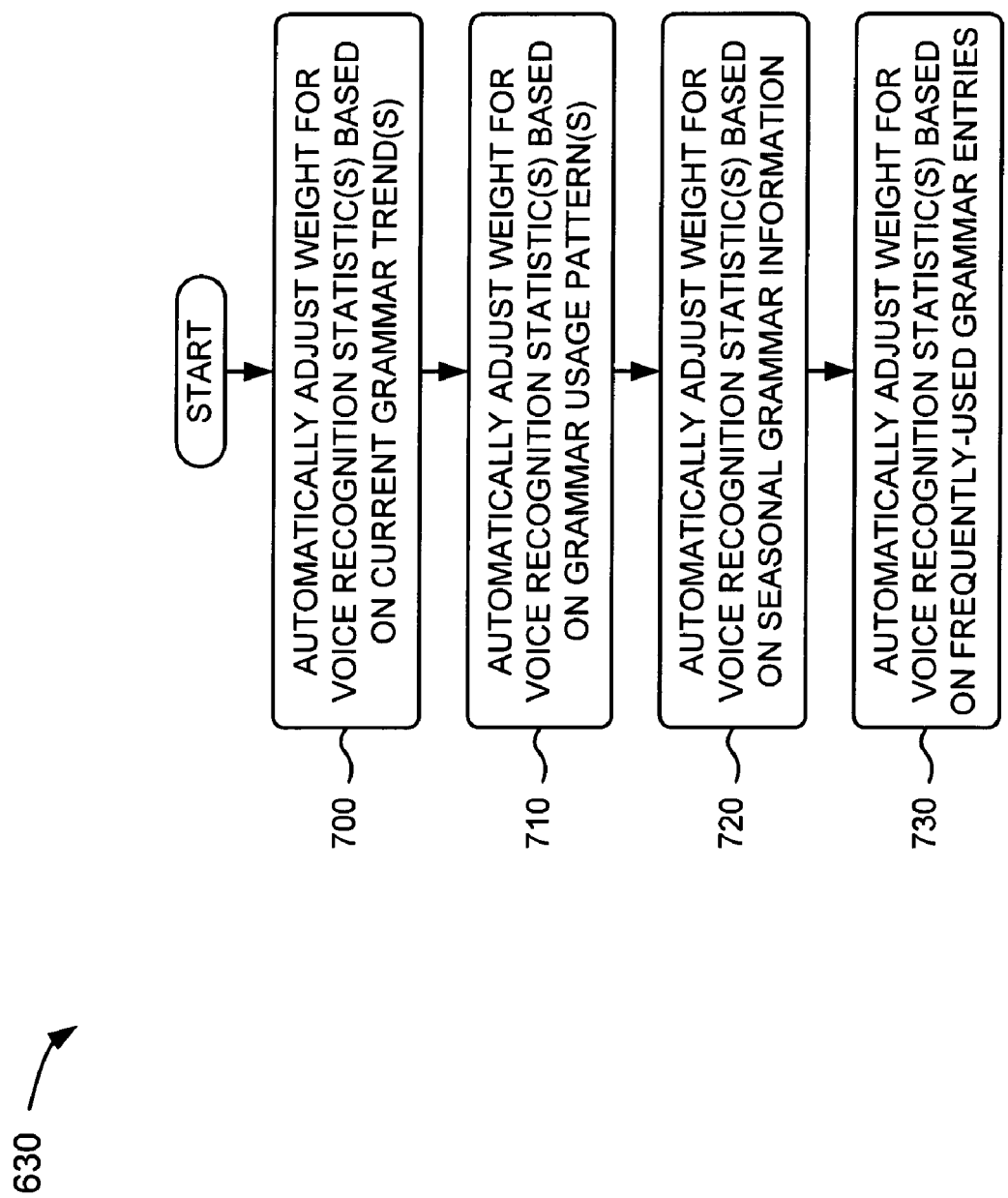

FIGS. 6 and 7 depict a flow chart of an exemplary process 600 for acquiring and using statistical information associated with voice recognition events to automatically adjust grammar usages and/or weightings of individual grammar entries, according to implementations described herein. In one implementation, process 600 may be performed by grammar server 110 (e.g., by grammar weighting system 120). In another implementation, some or all of process 600 may be performed by another device or group of devices (e.g., voice recognition server 130), including or excluding grammar server 110.

As illustrated in FIG. 6, process 600 may begin with receipt of a voice recognition statistic(s) (block 610), and application of a grammar weighting to the voice recognition statistic(s) (block 620). For example, in implementations described above in connection with FIG. 4, statistics gathering logic 400 of grammar server 110 may acquire statistical information associated with voice recognition events (e.g., from voice recognition server 130). In one example, statistics gathering logic 400 may receive voice recognition statistics 150 from voice recognition server 130. For example, statistics gathering logic 400 may receive current grammar trend information, grammar usage pattern information, seasonal grammar information, etc., associated with user inputs (e.g., voice recognition events), from voice recognition server 130. Grammar weighting logic 420 of grammar server 110 may receive voice recognition statistics 150 and/or improvement rules 440 (e.g., from database 410), and may apply improvement rules 440 to voice recognition statistics 150.

As further shown in FIG. 6, a weight of the voice recognition statistic(s) may be automatically adjusted based on the grammar improvement rule(s) (block 630), the weight adjusted voice recognition statistic(s) may be stored (block 640), and/or the weight adjusted voice recognition statistic(s) may be output for use in a voice recognition application (block 650). For example, in implementations described above in connection with FIGS. 4 and 5, improvement logic 520 of grammar server 110 may receive voice recognition statistics 150 from statistics loading logic 500 and improvement rules 440 from rules loading logic 510, and may generate updates 160 based on voice recognition statistics 150 and improvement rules 440. Updates 160 may include grammar entries with weights adjusted based on current or recent trend information (e.g., in an airline ticket IVR, the word "refund" may be received an inordinate amount of times if an airline recently had several flight cancellations), grammar usage pattern information (e.g., the name "John" is received twenty times and the name "Pete" is received only one time), seasonal grammar information (e.g., for a clothing IVR, the words "glove," "scarf," and "hat" are more likely to be received in the winter, and the words "shorts," "swimsuit," and "sandals" are more likely to be received in the summer), etc. In one example, improvement logic 520 may apply a variety of rules to voice recognition statistics 150 that automatically adjust weights of voice recognition statistics 150. Grammar weighting logic 420 of grammar server 110 may provide updates 160 to database 410 and/or to update deploying logic 430. Storing updates 160 in database 410 may enable grammar weighting system 120 to track output (e.g., updates 160) of grammar weighting logic 420 over time. Update deploying logic 430 may determine whether grammar weightings of voice recognition server 130 need to be updated. If update deploying logic 430 determines that the grammar weightings of voice recognition server 130 need to be updated, update deploying logic 430 may provide updates 160 to voice recognition server 130 for updating the grammar weightings.

Process block 630 may include the process blocks illustrated in FIG. 7. As shown in FIG. 7, process block 630 may include one or more of automatically adjusting the weight of the voice recognition statistic(s) based on one or more current grammar trends (block 700), automatically adjusting the weight of the voice recognition statistic(s) based on one or more grammar usage patterns (block 710), automatically adjusting the weight of the voice recognition statistic(s) based on seasonal information (block 720), and/or automatically adjusting the weight of the voice recognition statistic(s) based on one or more frequently used grammar entries (block 730). For example, in implementations described above in connection with FIG. 1, grammar weighting system 120 of grammar server 110 may generate updates 160 that may include grammar entries with weights adjusted based on current trend information, grammar usage pattern information, seasonal grammar information, etc. Additionally and/or alternatively, updates 160 may eliminate (or retire) grammar entries that have not been used, and may segregate more frequently used grammar entries from other grammar entries. With regard to grammar usage patterns, updates 160 may provide greater weights to more frequently used grammar entries than weights provided to less frequently used grammar entries. With regard to seasonal grammar information, updates 160 may provide greater weights to current seasonal grammar entries than weights provided to out-of-season grammar entries.

FIG. 8 depicts a flow chart of an exemplary process 800 for using grammar weighted voice recognition information in a voice recognition application, according to implementations described herein. In one implementation, process 800 may be performed by voice recognition server 130. In another implementation, some or all of process 800 may be performed by another device or group of devices, including or excluding voice recognition server 130.

As illustrated in FIG. 8, process 800 may begin with receipt of grammar weighted voice recognition information (block 810), and receipt of a voice response from a user (block 820). For example, in implementations described above in connection with FIG. 1, voice recognition server 130 may receive updates 160, and may use updates 160 to aid in interpreting voice recognition events received by voice recognition server 130. User 170 (e.g., via a user device, such as a telephone, a cellular radiotelephone, a personal digital assistant (PDA), etc.) may provide voice response 180 (e.g., a voice recognition event) to voice recognition server 130.

As further shown in FIG. 8, the voice response and the grammar weighted voice recognition information may be compared (block 830), and one or more words of the voice response may be determined based on the comparison (block 840). For example, in implementations described above in connection with FIG. 1, voice recognition server 130 may compare voice response 180 to updates 160 (and/or to any other information used by the voice recognition application to recognize speech), and may determine one or more words of voice response 180 based on the comparison.

Returning to FIG. 8, the one or more determined words may be used to formulate one or more actions (block 850), and the formulated one or more actions may be performed for the user (block 860). For example, in implementations described above in connection with FIG. 1, voice recognition server 130 may use the determined one or more words to formulate action 190 that may respond to voice response 180, and/or may perform action 190. For example, if a new Batman movie is playing, then voice recognition system 130 (e.g., a movie IVR) may likely receive a lot of voice responses 180 for show times, as opposed to requests for show times for other movies.

Implementations described herein may include systems and/or methods that acquires and uses statistical information associated with voice recognition events to automatically adjust grammar usages and/or weightings of individual grammar entries to improve overall voice recognition performance. For example, in one implementation, the systems and/or methods may receive voice recognition statistics (e.g., from a voice recognition application), and may apply grammar improvement rules to the voice recognition statistics. The systems and/or methods may automatically adjust weights of the voice recognition statistics based on the grammar improvement rules, may store the weight adjusted voice recognition statistics, and/or may output the weight adjusted voice recognition statistics for use in the voice recognition application.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

Also, the term "user" has been used herein, and is intended to be broadly interpreted to include grammar server 110 and/or voice recognition server 130 or a user of grammar server 110 and/or voice recognition server 130.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
receiving, by the computing device, a voice recognition statistic from a voice recognition application;
applying, by the computing device, a grammar improvement rule based on the voice recognition statistic;
automatically adjusting, by the computing device, a weight of the voice recognition statistic based on the grammar improvement rule; and
segregating, by the computing device, one or more frequently used grammar entries from other grammar entries;
comparing, by the computing device, a voice response from a user to the weight adjusted voice recognition statistic, where the voice response is compared to the one or more frequently used grammar entries prior to being compared to the other grammar entries; and
performing, by the computing device and in response to receiving the voice response, one or more actions based on one or more words of the voice response, where the one or more words are determined based on the comparison of the voice response to the weight adjusted voice recognition statistic.

2. The computing-device implemented method of claim 1, further comprising:
   storing the weight adjusted voice recognition statistic.

3. The computing device-implemented method of claim 1, where automatically adjusting a weight of the voice recognition statistic comprises at least one of:
   automatically adjusting the weight of the voice recognition statistic based on one or more current grammar trends;
   automatically adjusting the weight of the voice recognition statistic based on one or more grammar usage patterns;
   automatically adjusting the weight of the voice recognition statistic based on seasonal grammar information; or
   automatically adjusting the weight of the voice recognition statistic based on one or more frequently used grammar entries.

4. A computing device-implemented method, the method comprising:
   receiving, by the computing device, grammar weighted voice recognition information;
   segregating, by the computing device, one or more frequently used grammar entries from other grammar entries;
   receiving, by the computing device, a voice response from a user;
   comparing, by the computing device, the voice response to the grammar weighted voice recognition information, where the voice response is compared to the one or more frequently used grammar entries prior to being compared to the other grammar entries;
   determining, by the computing device, one or more words of the voice response based on the comparison of the voice response to the grammar weighted voice recognition information;
   using, by the computing device, the one or more words to formulate one or more actions that respond to the voice response; and
   performing, by the computing device, the one or more actions for the user.

5. The computing device-implemented method of claim 4, where the receiving the grammar weighted voice recognition information comprises at least one of:
   receiving voice recognition information that is weighted based on one or more current grammar trends;
   receiving voice recognition information that is weighted based on one or more grammar usage patterns; or
   receiving voice recognition information that is weighted based on seasonal grammar information.

6. A computer-readable memory device that stores computer-executable instructions, comprising:
   one or more instructions for receiving a voice recognition statistic from a voice recognition application;
   one or more instructions for applying a grammar improvement rule based on the voice recognition statistic;
   one or more instructions for automatically modifying a weight applied to a grammar to be used in the voice recognition application based on the grammar improvement rule;
   one or more instructions for segregating, one or more frequently used grammar entries from other grammar entries based on the modified weight and the grammar improvement rule;
   one or more instructions for comparing a received voice response to one or more words of the voice recognition statistic to formulate one or more actions that respond to the received voice response, where the received voice response is compared to the one or more frequently used grammar entries prior to being compared to the other grammar entries; and
   one or more instructions for performing the formulated one or more actions.

7. The computer-readable memory device of claim 6, where the voice recognition statistic comprises at least one of:
   current grammar trend information associated with voice recognition events;
   grammar usage pattern information associated with voice recognition events; or
   seasonal grammar information associated with voice recognition events.

8. The computer-readable memory device of claim 7, where the voice recognition statistic comprises current trend grammar information that includes information associated with current or recent user responses provided to the voice recognition application.

9. The computer-readable memory device of claim 7, where the voice recognition statistic comprises grammar usage pattern information that includes information associated with a number of times a particular voice recognition event is provided to the voice recognition application.

10. The computer-readable memory device of claim 7, where the voice recognition statistic comprises seasonal grammar information that includes information associated with a period of time that affects voice recognition events provided to the voice recognition application.

11. The computer-readable memory device of claim 6, where the voice recognition statistic comprises metadata associated with voice recognition events recognized by the voice recognition application, and confidence information that the voice recognition events were correctly recognized.

12. The computer-readable memory device of claim 6, where the grammar improvement rule comprises a rule that defines how weights of grammar entries may change in response to trends in voice recognition statistics.

13. The computer-readable memory device of claim 6, where the grammar improvement rule comprises at least one of:
   a rule that provides greater weights to more frequently used grammar entries than weights provided to less frequently used grammar entries; or
   a rule that provides greater weights to current seasonal grammar entries than weights provided to out-of-season grammar entries.

14. The computer-readable memory device of claim 6, where the voice recognition application comprises at least one of:
   an interactive voice response (IVR) application;
   a voice dialing application;
   a call routing application;
   a data entry application;
   a structured documents preparation application; or
   a content-based spoken audio search application.

15. The computer-readable memory device of claim 6, further comprising:
   one or more instructions for automatically adjusting the grammar based on one or more current grammar trends;
   one or more instructions for automatically adjusting the grammar based on one or more grammar usage patterns;
   one or more instructions for automatically adjusting the grammar based on seasonal grammar information; and
   one or more instructions for automatically adjusting the grammar based on one or more frequently used grammar entries.

16. The computer-readable memory device of claim 6, further comprising:
   one or more instructions for determining whether the voice recognition application needs to be updated prior to automatically adjusting the grammar.

17. The computer-readable memory device of claim 6, further comprising:
   one or more instructions for receiving a voice response from a user;
   one or more instructions for comparing the voice response to the modified grammar; and
   one or more instructions for determining one or more words of the voice response based on the comparison.

18. The computer-readable memory device of claim 17, further comprising:
   one or more instructions for using the one or more words to formulate one or more actions that respond to the voice response; and
   one or more instructions for performing the one or more actions for the user.

19. A system comprising:
   means for receiving a voice recognition statistic from a voice recognition application;
   means for applying a grammar improvement rule to the voice recognition statistic;
   means for segregating one or more frequently used grammar entries from other grammar entries based on the grammar improvement rule;
   means for comparing a received voice response to the one or more frequently used grammar entries prior to being compared to the other grammar entries to determine one or more actions that respond to the received voice response, where the received voice response is compared to the one or more frequently used grammar entries prior to being compared to the other grammar entries; and
   means for causing the determined one or more to be performed.

\* \* \* \* \*